US011864299B2

(12) United States Patent
Morrell et al.

(10) Patent No.: US 11,864,299 B2
(45) Date of Patent: Jan. 2, 2024

(54) SYSTEM AND METHOD FOR DISSIPATING WORKPIECE CHARGE BUILD UP

(71) Applicant: Applied Materials, Inc., Santa Clara, CA (US)

(72) Inventors: David Morrell, Gloucester, MA (US); Dawei Sun, Lynnfield, MA (US); Qin Chen, South Hamilton, MA (US)

(73) Assignee: Applied Materials, Inc., Santa Clara, CA (US)

( * ) Notice: Subject to any disclaimer, the term of this patent is extended or adjusted under 35 U.S.C. 154(b) by 26 days.

(21) Appl. No.: 17/740,859

(22) Filed: May 10, 2022

(65) Prior Publication Data

US 2023/0371160 A1 Nov. 16, 2023

(51) Int. Cl.
*H05F 3/06* (2006.01)

(52) U.S. Cl.
CPC .................................... *H05F 3/06* (2013.01)

(58) Field of Classification Search
CPC ........................................................ H05F 3/06
USPC ................................................ 361/220, 234
See application file for complete search history.

(56) References Cited

U.S. PATENT DOCUMENTS 11,705,302 B2 * 7/2023 Kitagawa ................ H01J 37/20 361/233
2001/0000759 A1 5/2001 Doley et al.
2010/0270262 A1 10/2010 Hanawa et al.
2011/0083696 A1 * 4/2011 Nasr ..................... B08B 7/0035 134/1.1
2018/0068754 A1 * 3/2018 Dylewicz .......... H01L 21/67051
2018/0138061 A1 5/2018 Kraus et al.
2019/0129394 A1 5/2019 Peitzsch
2020/0286717 A1 * 9/2020 Cho .................. H01J 37/32724
2021/0259087 A1 8/2021 Ramachandran et al.

FOREIGN PATENT DOCUMENTS

KR 2019-0069616 A 6/2019

OTHER PUBLICATIONS

International Search Report and Written Opinion dated Aug. 3, 2023 in corresponding PCT application No. PCT/US2023/018514.

* cited by examiner

*Primary Examiner* — Dharti H Patel
(74) *Attorney, Agent, or Firm* — NIELDS, LEMACK & FRAME, LLC

(57) ABSTRACT

A system and method for reducing charge on a workpiece disposed on a platen is disclosed. The system includes an ionizer to generate ionized gas from the source of backside gas. The ionizer may be used to introduce ionized gas into the backside gas channels of the platen. A controller is used to selectively allow backside gas and/or ionized gas into the backside gas channels. In certain embodiments, the platen also includes an exhaust channel in communication with an exhaust valve to ensure that the pressure within the volume between the top surface of the platen and the workpiece is maintained in a desired range. In one embodiment, the system includes a valving system in communication with the source of backside gas and also in communication with the ionizer. In another embodiment, the amount of ionization performed by the ionizer is programmable.

19 Claims, 4 Drawing Sheets

SYSTEM AND METHOD FOR DISSIPATING WORKPIECE CHARGE BUILD UP

FIELD

Embodiments of the present disclosure relate to systems and methods for dissipating workpiece charge build up, especially as workpieces are being removed from the platen.

BACKGROUND

The fabrication of a semiconductor device involves a plurality of discrete and complex processes. One such process may be an etch process, where material is removed from the workpiece. Another process may be a deposition process, wherein material is deposited on the workpiece. Yet another process may be an ion implantation process where ions are implanted into the workpiece.

The workpiece is typically clamped to a platen through the use of electrostatic forces. When the workpiece is to be removed from the platen, the clamping force is disabled. However, triboelectric charge may cause the workpiece to stick to the platen, making it difficult to safely remove the workpiece. Ground pins are commonly used to help dissipate this charge. However, these ground pins are limited in number and are also limited in range of motion. Therefore, the charge may not be completely dissipated. Furthermore, the ground pins may cause damage to the back side of the workpiece.

Therefore, it would be beneficial if there were a system and method for dissipating workpiece charge build up. It would also be advantageous if the system did not significantly impact the time to remove the workpiece or damage the workpiece.

SUMMARY

A system and method for reducing charge on a workpiece disposed on a platen is disclosed. The system includes an ionizer to generate ionized gas from the source of backside gas. The ionizer may be used to introduce ionized gas into the backside gas channels of the platen. A controller is used to selectively allow backside gas and/or ionized gas into the backside gas channels. In certain embodiments, the platen also includes an exhaust channel in communication with an exhaust valve to ensure that the pressure within the volume between the top surface of the platen and the workpiece is maintained in a desired range. In one embodiment, the system includes a valving system in communication with the source of backside gas and also in communication with the ionizer. In another embodiment, the amount of ionization performed by the ionizer is programmable.

According to one embodiment, a system for reducing charge on a workpiece is disclosed. The system comprises a platen comprising a top surface having one or more openings; one or more backside gas channels, each in communication with a respective opening on the top surface; an ionizer, in communication with a backside gas supply to generate ionized gas; a valving system having an outlet in communication with the one or more backside gas channels, a first inlet in communication with the backside gas supply and a second inlet in communication with an output of the ionizer; and a controller, in communication with the valving system, to selectively allow a first amount of backside gas from the first inlet and a second amount of ionized gas from the second inlet to pass to the outlet and into the backside gas channels. In some embodiments, during normal operation, the controller controls the valving system to allow the first inlet to be in communication with the outlet and during a dismount sequence, the controller controls the valving system to allow the second inlet to be in communication with the outlet. In certain embodiments, during normal operation, the second inlet is also in communication with the outlet to also introduce ionized gas into the backside gas channels. In some embodiments, the system comprises one or more exhaust channels in communication with openings on the top surface. In some embodiments, the system comprises an exhaust valve in communication with the exhaust channels. In certain embodiments, the controller opens the exhaust valve when the second inlet is in communication with the outlet. In certain embodiments, the ionized gas passes through conduits that are non-electrically conductive.

According to another embodiment, a system for reducing charge on a workpiece is disclosed. The system comprises a platen comprising a top surface having one or more openings; one or more backside gas channels, each in communication with a respective opening on the top surface; an ionizer, in communication with a backside gas supply to generate ionized gas, wherein an amount of ionization provided by the ionizer is programmable; a valving system having an outlet in communication with the one or more backside gas channels, and an inlet in communication with an output of the ionizer; and a controller, in communication with the ionizer to control the amount of ionization provided by the ionizer, wherein the ionized gas is provided to the inlet of the valving system. In some embodiments, during normal operation, the ionizer produces a first percentage of ionization and during a dismount sequence, the ionizer produces a second percentage of ionization. In certain embodiments, the second percentage is greater than the first percentage. In certain embodiments, the first percentage is 0%. In some embodiments, the system comprises one or more exhaust channels in communication with openings on the top surface. In some embodiments, the system comprises an exhaust valve in communication with the exhaust channels. In some embodiments, the exhaust valve is open when the amount of ionization is greater than 0%.

According to another embodiment, a system for reducing charge on a workpiece is disclosed. The system comprises a platen comprising a top surface having one or more openings; one or more backside gas channels, each in communication with a respective opening on the top surface; and an ionizer, in communication with a backside gas supply to generate ionized gas; wherein, during at least a portion of time that a workpiece is disposed on the platen, ionized gas is flowing through the backside gas channels. In some embodiments, the at least a portion of time comprises a dismount sequence. In some embodiments, the at least a portion of time comprises normal operation when the workpiece is subject to a semiconductor process. In some embodiments, more ionized gas flows through the backside gas channels during a dismount sequence than during normal operation. In some embodiments, the system comprises exhaust channels in communication with openings on the top surface to allow ionized gas to exit a volume between the top surface and a bottom surface of the workpiece.

BRIEF DESCRIPTION OF THE FIGURES

For a better understanding of the present disclosure, reference is made to the accompanying drawings, which are incorporated herein by reference and in which.

DETAILED DESCRIPTION

Figure 1:
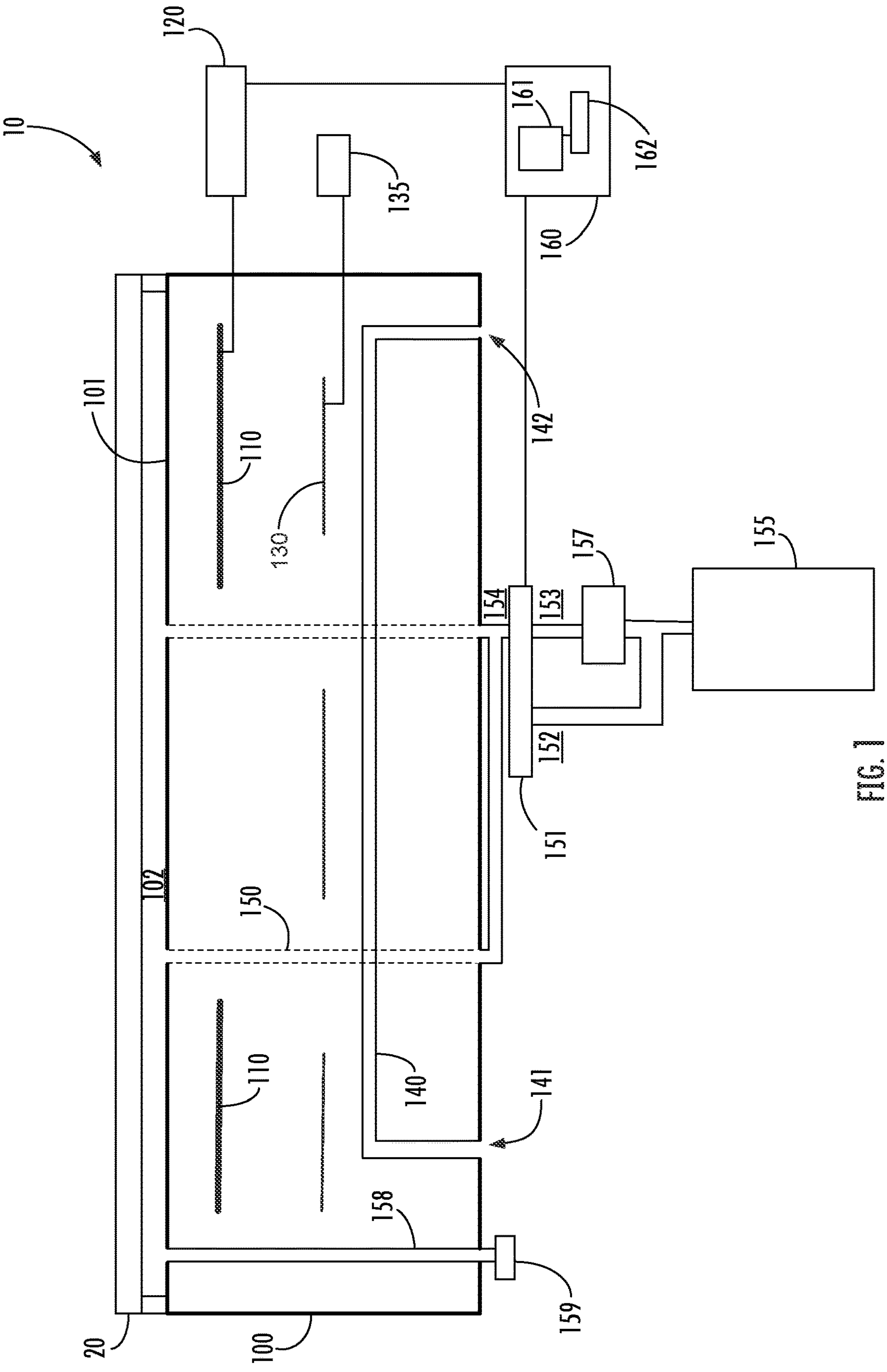
FIG. 1 is a cross-sectional view of the system for dissipating workpiece charge build up according to one embodiment.

FIG. 1 shows a system that may be used to reduce charge and minimize damage to the workpiece when the workpiece is being dismounted. The system 10 includes a platen 100. The platen 100 includes one or more electrodes 110 disposed therein. These electrodes 110 are in communication with an electrode power supply 120. The electrode power supply 120 may supply a DC or AC voltage to the electrodes 110. The frequency and amplitude of the voltage supplied to the electrodes 110 may be dictated by the design and are not limited by this disclosure. In certain embodiments, the electrodes 110 may be arranged in pairs, where voltages of opposite polarity are provided to the pair.

The platen 100 may also include heaters 130 embedded in the platen 100. These heaters 130 may be used to heat the platen 100 to a desired temperature. These heaters 130 may be resistive elements, where current is passed through the heaters 130 to increase their temperature. The heaters 130 may be in communication with a heating power supply 135. In certain embodiments, the heaters 130 and heating power supply 135 may not be included.

The platen 100 may also include embedded fluid channels 140 that include an inlet 141 and an outlet 142. In certain embodiments, a fluid source is in communication with the inlet 141. Fluid may enter the platen 100 through the inlet 141, pass through the fluid channels 140 and exit through the outlet 142. In some embodiments, this fluid may be cooled, such as cooled water or liquid nitrogen. In other embodiments, the fluid may be heated, such as heated water. In some embodiments, a pump may be used to recirculate the fluid passing through the fluid channels 140. In certain embodiments, the fluid channels 140 may not be included in the platen 100.

Backside gas channels 150 may pass through the platen 100 terminating on the top surface 101 of the platen 100. The backside gas channel 150 may be in communication with a valving system 151. The valving system may have a first inlet 152, a second inlet 153 and an outlet 154. The valving system 151 may be configured to allow the passage from the first inlet 152, the second inlet 153 or both inlets to the outlet 154. The outlet 154 may be in communication with the backside gas channels 150. In one embodiment, the valving system 151 may comprise two Mass Flow Controllers (MFC), where each MFC is used to control the flow of gas from a respective inlet to the outlet 154. In another embodiment, the valving system may comprise a plurality of on-off valves, which are used to independently control the flow from a respective inlet to the outlet 154. In another embodiment, a variable valve may be used to control the flow rate of each inlet. In another embodiment, one or two valves and one or two Mass Flow Controllers may be used to regulate the flow of gas from the respective inlet to the outlet 154. In other embodiments, a different configuration may be used. In all configurations, the valving system 151 is able to allow flow from the first inlet 152 to the outlet 154 or from the second inlet 153 to the outlet 154. In certain embodiments, the valving system 151 may be configured to allow flow from both inlets simultaneously. The valving system 151 may also be configured to regulate the flow rate from each inlet and/or the total flow rate from the outlet 154.

In normal operation, the valving system 151 may be used to control the flow of gas from the gas source 155 to the backside gas channels 150. Normal operation is defined as time wherein the workpiece is disposed on the platen and subjected to a semiconductor process, such as deposition, etching, or implantation. The gas source 155 may supply any suitable gas, such as air or nitrogen, although other gasses may be utilized. For example, a gas source 155 may be in communication with the first inlet 152 of the valving system 151. When the valving system 151 is configured to allow flow from the first inlet 152 to the outlet 154, backside gas is introduced into the volume 102 between the top surface 101 of the platen 100 and the backside of the workpiece. This backside gas increases the thermal conductivity between the top surface of the platen 100 and the workpiece 20. In certain embodiments, the backside gas may be supplied so as to maintain a pressure of about 0-30 Torr.

The system 10 also includes an ionizer 157. The ionizer 157 may accept any suitable gas, such as air or nitrogen, as an input gas. The ionizer 157 creates ionized gas. The ionizer 157 may be any suitable ionizer, including those that are commercially available, such as from Simco. The inlet of an ionizer 157 may be in communication with the gas source 155, such that gas from the gas source 155 may enter the ionizer 157. This gas that enters the ionizer 157 is ionized by the ionizer 157 so as to create charged ions. These charged ions may be emitted from the outlet of the ionizer 157, which is in communication with the second inlet 153 of the valving system 151.

Thus, when the valving system 151 allows gas from the second inlet 153 to flow through to outlet 154, ionized gas travels through the backside gas channels 150.

In certain embodiments, it may be advantageous to deliver a minimum flow rate through the ionizer 157. In certain embodiments, this minimum flow rate may be greater than that used to maintain the desired backside gas pressure. For example, the minimum flow rate may induce a backside pressure greater than 0-30 torr. Therefore, in these embodiments, the platen 100 may include one or more exhaust channels 158. These exhaust channels 158 may be in communication with openings on the top surface of the platen 100. The output of these exhaust channels 158 may be in communication with an exhaust valve 159. In normal operation, when only backside gas is being supplied to the volume 102 between the platen 100 and the workpiece 20, the exhaust valve 159 may be kept closed. However, when ionized gas is being supplied to this volume, during either normal operation or during the dismount sequence, the exhaust valve 159 may be open to allow the excess ionized gas to exit from this volume 102. The exhaust valve 159 may be a simple on/off valve. In other embodiments, the exhaust valve 159 may be coupled to a pressure sensor so as to maintain a desired pressure in the volume 102. In certain embodiments, the exhaust valve 159 and exhaust channels 158 may not be utilized.

A controller 160 may be in communication with the electrode power supply 120, the valving system 151 and exhaust valve 159. The controller 160 has a processing unit 161 and an associated memory device 162. This memory device 162 contains the instructions, which, when executed by the processing unit 161, enable the system 10 to perform the functions described herein. This memory device 162 may be a non-volatile memory, such as a FLASH ROM, an electrically erasable ROM or other suitable devices. In other embodiments, the memory device 162 may be a volatile memory, such as a RAM or DRAM. In certain embodiments, the controller 160 may be a general purpose computer, an embedded processor, or a specially designed microcontroller. The actual implementation of the controller 160 is not limited by this disclosure.

The controller 160 is in communication with the valving system 151 to selectively allow a first amount of gas from the first inlet 152 and a second amount of gas from the second inlet 153 to pass through the outlet 154 and into the backside gas channels 150.

Figure 2:
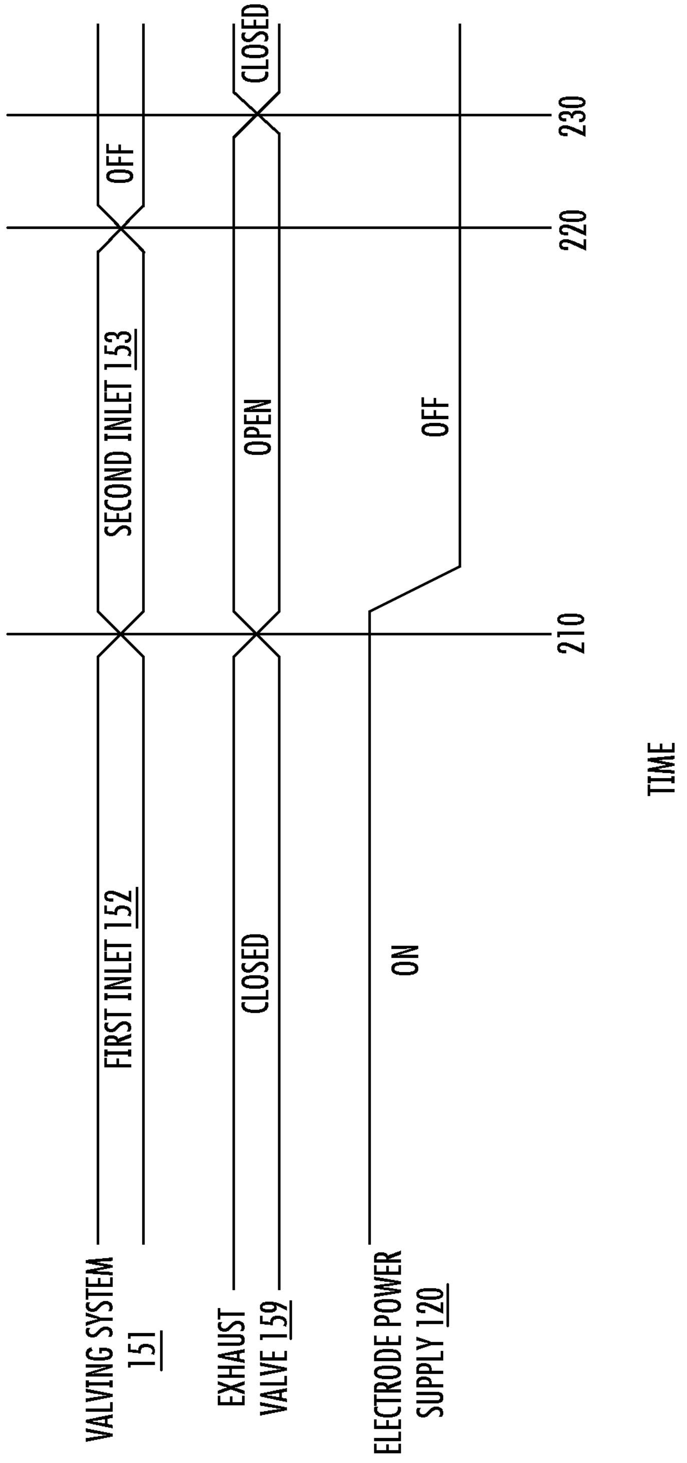
FIG. 2 shows a waveform illustrating the operation of the valving system, exhaust valve and electrode power supply according to one embodiment.

As shown in FIG. 2, in normal operation, before time 210, the controller 160 may actuate the electrode power supply 120 so as to hold the workpiece 20 in place. Additionally, the controller 160 may control the valving system 151 such that the first inlet 152 is in communication with outlet 154 so as to supply backside gas to the volume 102 between the top surface of the platen 100 and the workpiece 20. At this time, the exhaust valve 159 may be closed, such that the backside gas is maintained at the desired pressure.

When it is time to remove the workpiece from the platen 100, the controller 160 alters the control of these three components. This may occur after time 210. In other words, time 210 represents the end of normal operation and the beginning of the dismount sequence. Specifically, during the dismount sequence, the controller 160 may control the valving system 151 such that the second inlet 153 is in communication with the outlet 154. This allows the flow of ionized gas through the backside gas channels 150 and into the volume 102 between the workpiece 20 and the platen 100. In certain embodiments, 100% of the gas that is emitted from the outlet 154 is ionized gas. In other embodiments, the valving system 151 is configured to allow gas from both the first inlet 152 and the second inlet 153 to pass to the outlet 154.

As noted above, in certain embodiments, the flow rate of the ionized gas from the ionizer 157 during the dismount sequence may be greater than that needed to maintain the desired backside gas pressure. This may be due to the fact that a large number of ions may have to be introduced into the volume 102 in order to neutralize the triboelectric charge on the workpiece 20. To introduce this number of ions, the flow rate of the ionized gas may be in excess of that needed during normal operation. Thus, the controller 160 may open the exhaust valve 159 to allow an exit path for the gas in the volume 102. In certain embodiments, the exhaust valve 159 may be opened prior to the introduction of the ionized gas.

The flow of ionized gas into the volume 102 allows charge neutralization of the residual charge on the workpiece 20 as the workpiece 20 is being removed from the platen 100. After the flow of ionized gas begins, the controller 160 may disable the electrode power supply 120. In this way, the workpiece 20 can be removed, since there are no longer any clamping forces.

At a later time, such as time 220, the controller 160 may disable valving system 170 such that no gas passes through the backside gas channels 150. The exhaust valve 159 may then be closed after the flow of gas through the backside gas channels has been terminated, such as at time 230.

In another embodiment, the controller 160 may control the valving system 151 during normal operation so that a mix of ionized gas from second inlet 153 and backside gas from first inlet 152 pass through the outlet 154. The mix of these gasses may change after time 210. For example, the mix after time 210 may contain a greater percentage of ionized gas than is present during normal operation. In embodiments where ionized gas is used during normal operation, the exhaust valve 159 may be open during normal operation as well. The use of some ionized gas during normal operation may help control charge buildup during ion implantation, etching and other semiconductor processes. In certain embodiments, the mix of backside gas and ionized gas may be the same during normal operation and during the dismount sequence.

Figure 3:
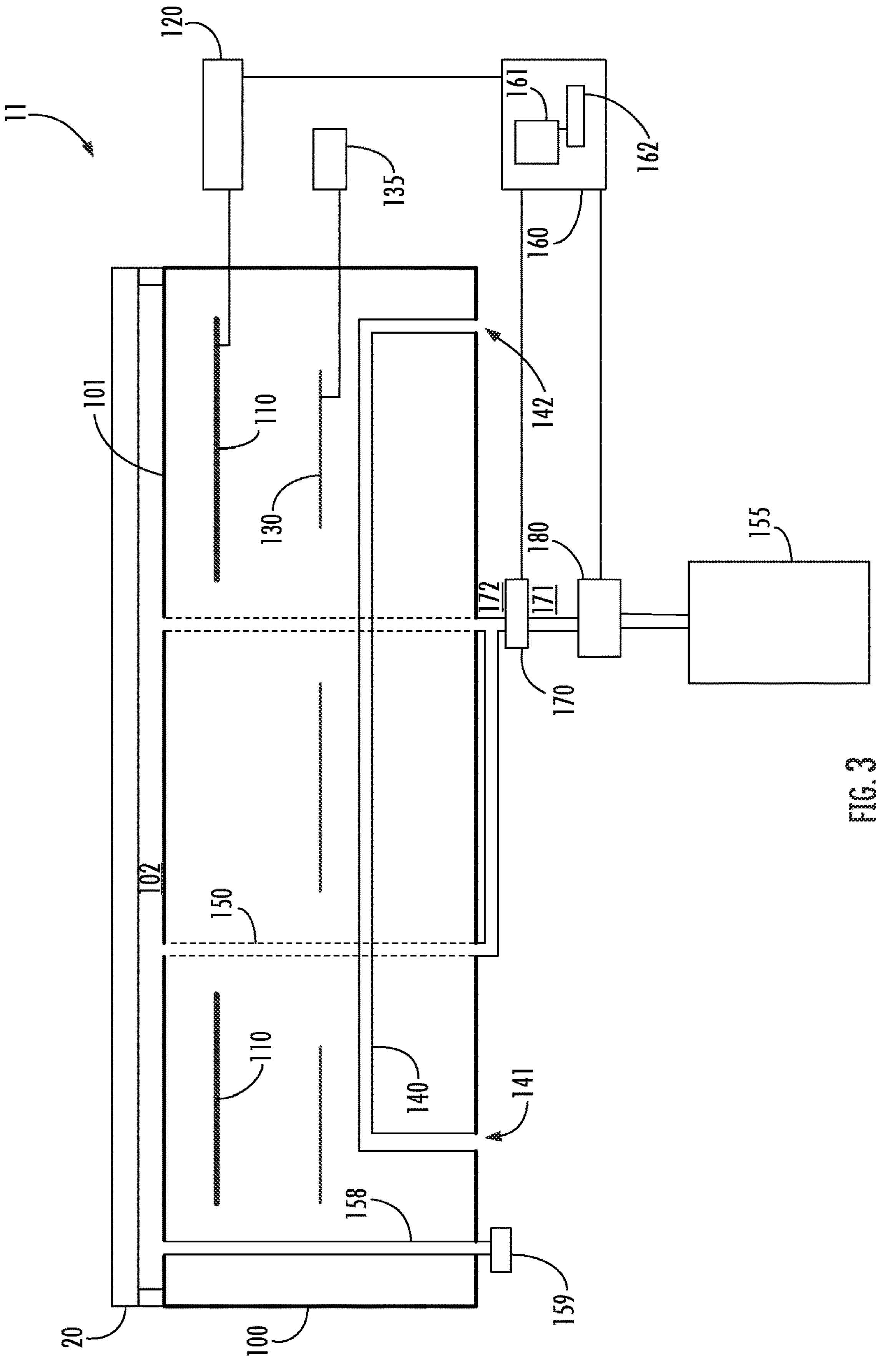
FIG. 3 is a cross-sectional view of the system for dissipating workpiece charge build up according to another embodiment.

FIG. 3 shows a second embodiment of the system 11. Components that are identical to those in FIG. 1 have been given the same reference designators. In this configuration, the amount of ionization provided by the ionizer 180 may be configurable or programmable. In other words, at 0%, the ionizer does not ionize any gas. At 100%, the ionizer is operating at its peak such that the amount of ions created is maximized. In this embodiment, the controller 160 may also be in communication with the ionizer 180 so as to control the amount of ionization provided by the ionizer 180. The output of the ionizer 180 is in communication with an inlet 171 of the valving system 170. The outlet 172 of the ionizer is in communication with the backside gas channels 150. The valving system 170 may be configured to allow a variable flow rate to pass therethrough. For example, the valving system 170 may be a Mass Flow Controller (MFC). In other embodiments, the valving system 170 may include an on-off valve.

Figure 4:
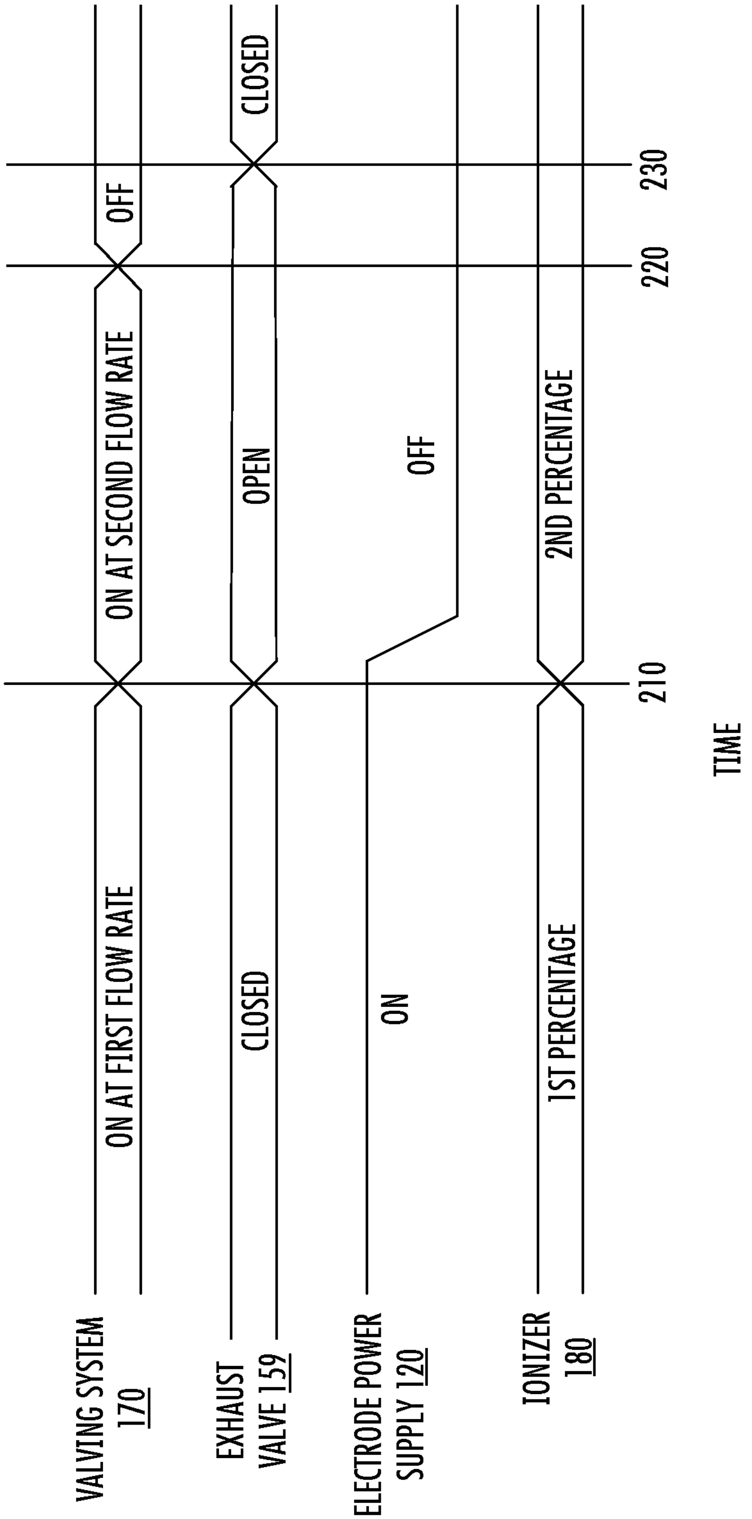
FIG. 4 shows a waveform illustrating the operation of the valving system, exhaust valve and electrode power supply according to another embodiment.

FIG. 4 shows the operation of this system 11. During normal operation, before time 210, the controller 160 may control the ionizer 180 to produce a first percentage of ionized gas. This first percentage may be 0%, such that the ionizer 180 does not produce any ionized gas, but rather allows the backside gas from the gas source 155 to pass through the ionizer 180. The valving system 170 may be configured to allow a first flow rate which is used to maintain the pressure within the volume 102. In another embodiment, the first percentage may be greater than 0%. During normal operation, the exhaust valve 159 may be closed.

When it is time to dismount the workpiece 20, after time 210, the controller 160 may control the ionizer 180 so as to increase the percentage of ionized gas that is generated by the ionizer 180 and is passed to the valving system 170. Thus, in some embodiments, the second percentage is greater than the first percentage. The exhaust valve 159 may be opened during the dismount sequence so as to maintain the pressure within the volume 102 within a desired range while allowing a sufficient number of ions to be introduced into the volume 102. At some time after time 210, the controller 160 may disable the electrode power supply 120 such that the workpiece 20 may be removed. Additionally, the valving system 170 may be controlled so as to disable the flow of gas into the backside gas channels 150, such as at time 220. At a later time, such as time 230, the exhaust valve 159 may be closed.

In another embodiment, it may be beneficial to introduce some ionized gas during normal operation. In this embodiment, the first percentage may be greater than 0%. If the flow rate is sufficiently high, the controller 160 may open the exhaust valve 159 to maintain the pressure within the volume 102 at the desired range. The rest of the operation may be as shown in FIG. 4.

In another embodiment, it may be beneficial to introduce the same amount of ionized gas during normal operation as is used during the dismount sequence. In this embodiment, the first percentage and the second percentage are the same and the exhaust valve 159 may be open during normal operation. The rest of the operation may be as shown in FIG. 4.

In both FIG. 2 and FIG. 4, it can be seen that during at least a portion of the time that the workpiece is disposed on the platen, ionized gas is flowing through the backside gas channels 150. The ions in this ionized gas serve to reduce the charge on the workpiece 20. This charge may be caused by the semiconductor process that is being performed on the workpiece, or due to triboelectric charge.

In certain embodiments, the conduits that are used to deliver ionized gas from the ionizer to the volume 102 may be made from a non-electrically conductive material, such as polyetheretherketone (PEEK) or a polyimide, such as VESPEL® polyimide. In embodiments where it is not convenient to utilize plastic parts to deliver the ionized gas, a conformal coating of an insulating material, such as Parylene, may be applied to the inner walls of the conduits. In certain embodiments, the conduit between the ionizer and the valving system are made of plastic or has interior walls that are coated with an insulating material. In some embodiments, the valving system is made of plastic or coated with an insulating material.

The system and method described herein have many advantages. During removal of a workpiece from a platen, "sticking" may occur due to residual charge from the electrostatic chuck or triboelectric charge created during the lifting of the workpiece. Damage or breakage of the workpiece may occur as a result. Further charged workpieces may be dropped by a pick arm. Currently, this triboelectric charge is mitigated through the use of ground pins that extend upward from the top surface of the platen 100. However, these ground pins have a limited range of motion. Further, the ground pins may cause damage to the backside of the workpiece 20. In contrast, the present disclosure describes a system and method wherein ionized gas is used to remove the triboelectric charge. Consequently, there is no physical contact with the back side of the workpiece, which minimizes the likelihood of damage. Further, in certain embodiments, the ionized gas may be used to control charge buildup on the workpiece during various semiconductor processes, such as ion implantation.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Furthermore, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A system for reducing charge on a workpiece, comprising:

- a platen comprising a top surface having one or more openings;
- one or more backside gas channels, each in communication with a respective opening on the top surface;
- an ionizer, in communication with a backside gas supply to generate ionized gas;
- a valving system having an outlet in communication with the one or more backside gas channels, a first inlet in communication with the backside gas supply and a second inlet in communication with an output of the ionizer; and
- a controller, in communication with the valving system, to selectively allow a first amount of backside gas from the first inlet and a second amount of the ionized gas from the second inlet to pass to the outlet and into the one or more backside gas channels.

2. The system of claim 1, wherein during normal operation, the controller controls the valving system to allow the first inlet to be in communication with the outlet and during a dismount sequence, the controller controls the valving system to allow the second inlet to be in communication with the outlet.

3. The system of claim 2, wherein during normal operation, the second inlet is also in communication with the outlet to also introduce the ionized gas into the one or more backside gas channels.

4. The system of claim 1, further comprising one or more exhaust channels in communication with the one or more openings on the top surface.

5. The system of claim 4, further comprising an exhaust valve in communication with the one or more exhaust channels.

6. The system of claim 5, wherein the controller opens the exhaust valve when the second inlet is in communication with the outlet.

7. The system of claim 1, wherein the ionized gas passes through conduits that are non-electrically conductive.

8. A system for reducing charge on a workpiece, comprising:

- a platen comprising a top surface having one or more openings;
- one or more backside gas channels, each in communication with a respective opening on the top surface;
- an ionizer, in communication with a backside gas supply to generate ionized gas, wherein an amount of ionization provided by the ionizer is programmable;
- a valving system having an outlet in communication with the one or more backside gas channels, and an inlet in communication with an output of the ionizer; and
- a controller, in communication with the ionizer to control the amount of ionization provided by the ionizer, wherein the ionized gas is provided to the inlet of the valving system.

9. The system of claim 8, wherein during normal operation, the ionizer produces a first percentage of ionization and during a dismount sequence, the ionizer produces a second percentage of ionization.

10. The system of claim 9, wherein the second percentage is greater than the first percentage.

11. The system of claim 9, wherein the first percentage is 0%.

12. The system of claim 8, further comprising one or more exhaust channels in communication with the one or more openings on the top surface.

13. The system of claim 12, further comprising an exhaust valve in communication with the one or more exhaust channels.

14. The system of claim 13, wherein the exhaust valve is open when the amount of ionization is greater than 0%.

15. A system for reducing charge on a workpiece, comprising:

a platen comprising a top surface having one or more openings;

one or more backside gas channels, each in communication with a respective opening on the top surface; and an ionizer, in communication with a backside gas supply to generate ionized gas;

wherein, during at least a portion of time that a workpiece is disposed on the platen, the ionized gas is flowing through the one or more backside gas channels.

16. The system of claim 15, wherein the at least a portion of time comprises a dismount sequence.

17. The system of claim 15, wherein the at least a portion of time comprises normal operation when the workpiece is subject to a semiconductor process.

18. The system of claim 17, wherein more of the ionized gas flows through the one or more backside gas channels during a dismount sequence than during normal operation.

19. The system of claim 15, comprising exhaust channels in communication with the one or more openings on the top surface to allow the ionized gas to exit a volume between the top surface and a bottom surface of the workpiece.

* * * * *